Jan. 30, 1940.  Ö. RISZDORFER  2,188,820
PHOTOGRAPHIC CAMERA
Filed April 14, 1937   2 Sheets-Sheet 1
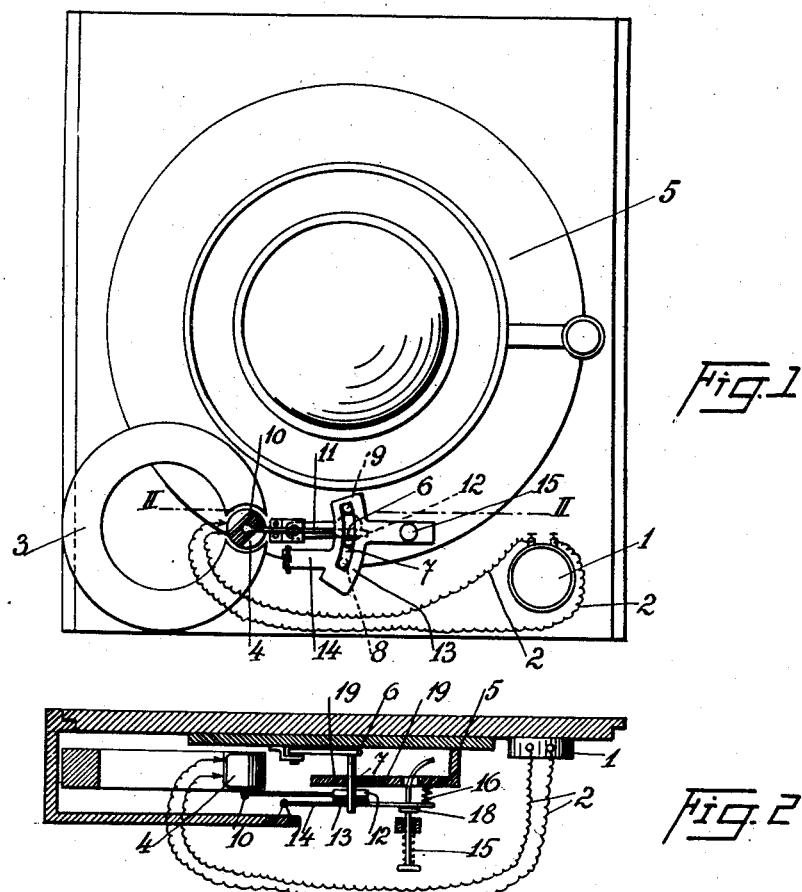
Fig.1
Fig.2
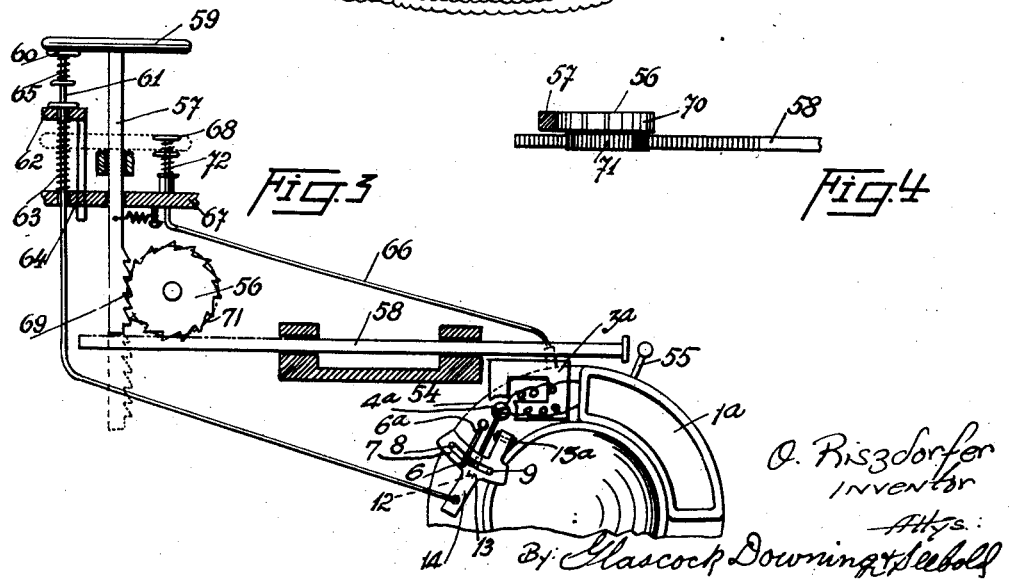
Fig.3
Fig.4
O. Riszdorfer
INVENTOR
By Glascock Downing & Seebold
Attys.

Jan. 30, 1940.　　　Ö. RISZDORFER　　　2,188,820
PHOTOGRAPHIC CAMERA
Filed April 14, 1937　　　2 Sheets-Sheet 2
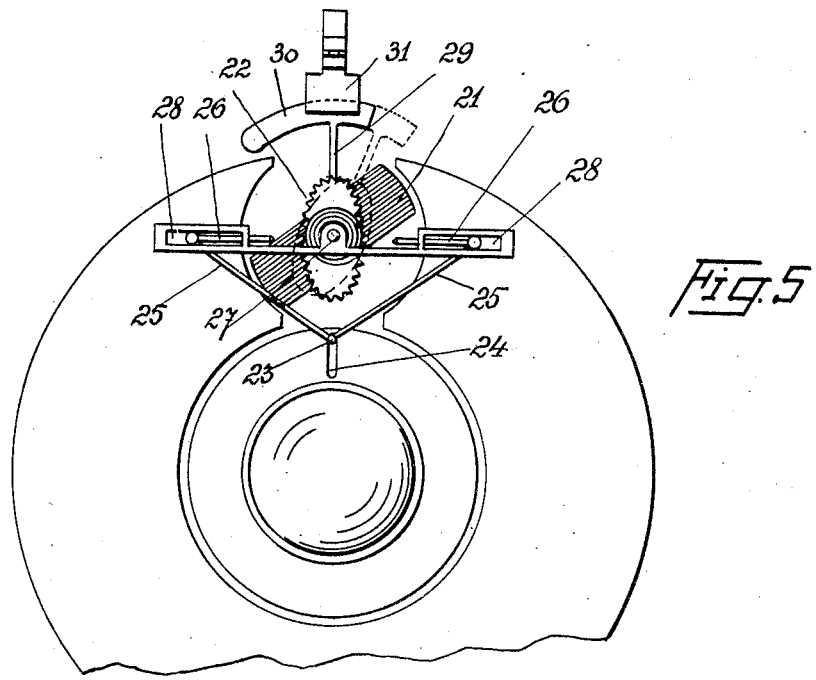
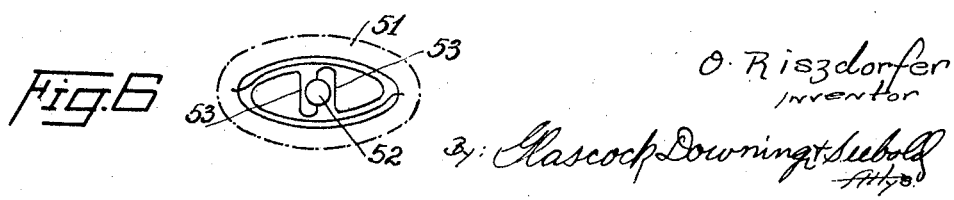

Patented Jan. 30, 1940

2,188,820

UNITED STATES PATENT OFFICE 2,188,820

PHOTOGRAPHIC CAMERA

Ödön Riszdorfer, Budapest, Hungary

Application April 14, 1937, Serial No. 136,954
In Germany July 11, 1935

4 Claims. (Cl. 95—53)

Photographic cameras having exposure regulating means incorporated are known, in which the device for adjusting the lens diaphragm or the shutter is connected with a feeler member which is moved into contact with the rotating part of an electrical exposure meter, while the movable part is held fast before being touched, by means of clamping jaws.

According to the invention in such photographic cameras the clamping jaw for fixing the rotating part of the exposure meter is provided with a slot and the feeler member is movably arranged in the slot.

In the accompanying drawings four constructional examples of the arrangement are illustrated diagrammatically.

Fig. 1 shows one constructional form in plan,
Fig. 2 is a section on the line II—II in Fig. 1,
Fig. 3 is a further constructional form in plan,
Fig. 4 shows a detail of the same constructional form in elevation.
Fig. 5 is a side elevation of a third construction,
Fig. 6 shows a detail of a resilient connection on the meter shaft.

In Fig. 1, 1 is a photocell, the current from which is supplied to a coil 4 arranged in the field of a permanent magnet 3 through a conductor 2. 5 is an ordinary lens shutter, the pin 6 of which is moved in a slot 7. The movement of the pin from the position 8 shown in broken lines, up to the position 9, also shown in broken lines, corresponds for example to an exposure of one second. It will be understood that the pin 6 is a part of a time control or retard mechanism which controls the duration of the shutter opening in a well known manner. An arm 11 secured on the coil axle 10 carries a stop 12 which is moved along the slot 7. A pressure plate 13 carried on a lever arm 14 is arranged so that it can be pressed against the stop 12 and against the force of a spring 16 by means of a release member 15.

The device works as follows. If the photographic apparatus is pointed at an object to be photographed the coil 4 is deflected corresponding to the brightness of the object as it affects the cell 1 and the stop 12 is moved into the position shown in Fig. 1, corresponding to an exposure of, for example, ⅒ of a second. When the shutter is wound up the pin 6 is in the position 8. If the release 15 is now depressed, the driver 18, as shown in Fig. 2, first presses the plate 13 against the stop 12 and holds it fast against the strip 19 underlying the path of the stop 12, after which the shutter is released.

Fig. 3 shows a constructional form of the invention as applied to a shutter of the type commonly referred to as a "Compur" type shutter. Such a shutter has a casing 54, a winding lever 55, and a pin 6 forming a part of the retard mechanism which controls the duration of the shutter opening in accordance with its position in its range of movement between the positions indicated at 8 and 9. In this case the pin 6 is biased toward the extreme position 9 corresponding to the maximum exposure interval by suitable means shown for convenience as comprising a weak leaf spring 6a anchored to the casing 54.

As was the case in Fig. 1, a light sensitive cell 1a is connected to a meter coil 4a having a pointer arm 11 and an associated magnet 3a. In a way similar to that shown in Fig. 2, the pointer arm 11 carrying a stop 12 moves parallel to and between a strip 19 and a pressure plate 13 so arranged that the plate 13 may be made to press the stop 12 against the strip 19 to hold the stop 12 in its position as governed by the cell 1a. Thus, as will be described below, with the stop 12 held stationary, when the lever 55 is actuated to wind the shutter the pin 6 will be moved by the biasing spring 6a into engagement with the stop 12 thereby setting the shutter interval in accordance with the deflection of the meter pointer arm 11.

The arrangement shown in Fig. 3 for arresting the meter stop 12, actuating the winding lever 55 and releasing the shutter in sequence will now be described. A rotatable toothed wheel 56 provided with two sets of teeth 70 and 71 is arranged so that the teeth 70 and 71 respectively cooperate with two toothed rods 57 and 58. The rod 58 is horizontally disposed so that upon being moved toward the right it actuates the winding lever 55. In this particular embodiment the rod 57 is vertically disposed and when moved downward its teeth 69 act on teeth 70 to rotate the disk 56 in a counter-clockwise direction and thereby move the rod 58 to the right to wind the shutter.

At the upper end of the rod 57 a press button 59 is provided, which, in the initial position, rests on the button 60 of an ordinary cable release. The part 61, which is fixed with respect to the moving part of the release, is supported on the carrier 62, which itself is supported with respect to the stationary stop 64 by means of a spring 63 which is stronger than the return spring 65 of the release. This release acts on the arresting device 12 and 13 in a similar manner to the release 15 of Figs. 1 and 2. A further release 66 which releases the shutter is arranged on a stationary stop 67 in such a manner that its button 68 is not touched by the press button 59 in the initial position.

The device acts as follows: When the button 59 is depressed, it acts upon the button 60 of the first release, so that first of all the arresting device is operated to hold the stop 12 stationary. At the same time, by means of the disk 56, the rod 58 is moved to the right and actuates the lever 55 after the closing of the arresting device. The teeth 69 on the rod 57 are formed in such a position that, when the shutter has been wound up, the teeth 69 no longer engage with the disk 56. The disk 56 carries two sets of teeth, as shown in Fig. 4, of which the set 70 engage with the teeth 69 on the rod 57, and the set 71 engage with the teeth on the rod 58. The distance of the press button 59 from the button 68 is so chosen that the release 66 of the shutter is actuated by the button 59 only after the winding of the shutter has already taken place as described. After the release of the shutter, when the button 59, the rod 57 and the release 60—65 are in the position shown in broken lines, the lever 55 guides the disk 56 back to the initial position by means of the rod 58. Now the disk 56 can rotate freely, since the teeth 70 are out of engagement with the rod 57. The springs 63, 65 and 72 return the release to the initial position when the press button 59 is released.

The pin 6 having been moved by the spring 6a into contact with the stop 12 when the shutter was wound, will as is well understood in this type of shutter be engaged and moved back to the position 8 when the shutter is released, thereby retarding the closing action of the shutter in accordance with the position of the stop 12.

In the construction according to Fig. 5, the coil 21 carries an elliptical disk 22, which is rigidly connected with its axle 27 and has teeth at its edge. With these co-operate bolts 26 actuated through rods 25 by the pin 23 of the shutter, which is guided in a straight line by the slots 24, which bolts are guided in two oppositely disposed slots 28 in a common straight line passing through the axle 27 of the coil. On an extension 29 the ellipse 22 carries a small block 30 arranged beneath its plane, which moves underneath the pressure plate 31 of the arresting device described with reference to Figs. 1 and 2.

If when the shutter is wound the photocell, which is not illustrated, receives light from the object to be photographed, the coil 21 will receive a current proportional to the brightness of the object and will be deflected, carrying the ellipse 22 with it (see position shown in broken lines). If then the release co-operating with the plate 31 according to Fig. 2 is operated, it will hold the block 30 fast, together with the coil above the plate, after which the pin 23 will run down. The movement of the pin is restricted by the distance of the bolts 26 from the edge of the ellipse 22. It becomes smaller the more the coil 21 turns inwards, that is, the greater the current is. Since the bolts move in diagonal of the ellipse, the axle 27 is relieved from bending stresses.

It will be understood that the pin 23 controls the retard mechanism of the shutter in accordance with its position in substantially the same manner as pin 6 in the arrangement shown in Fig. 3.

In order to avoid any load on the axle of the electrical instrument, the stop can also be resiliently connected with the axle. Fig. 6 shows such a construction with an elliptical disc according to Fig. 5. The disc 51 in this case is perforated and is secured to the axle 52 by means of two spiral springs 53. This allows of a relative movement between the disc 51 and the axle 52 in the case of shocks and the like and therefore avoids undue stresses on the axle.

The invention can be used for shutters of any kind, that is, for example, on blind shutters, in which the mechanism has movable parts which, during the running down of the shutter, move along tracks, the lengths of which determine the time of exposure. The limiting of this track by photo-electrically controlled stops is effected in the manner described with reference to Figs. 1–3.

The electric current actuating the coil in the constructions as shown in Figs. 1–3, can also be influenced in accordance with one or more other members which determine the correct exposure, as for example, by the position of the diaphragm. This can also be effected by means of mechanical connections.

What I claim is:

1. A photographic camera having a shutter, a photoelectric meter having a pointer displaceable in accordance with the activation of the meter, means movable to hold said pointer in its displaced position, shutter winding mechanism, a member adapted to control the exposure interval of the shutter in accordance with its position and movable to a position determined by said pointer when the shutter is wound, a shutter release, and an operating member movable through a predetermined path for actuating in sequence said holding means, said shutter winding mechanism and said shutter release.

2. A camera as claimed in claim 1 wherein the operating member is coupled to the shutter winding mechanism through motion transmitting means including a driving connection which releases upon completion of the shutter winding movement.

3. A photographic camera including a shutter, means movable for winding the shutter, a part whose position determines the interval setting of the shutter, means biasing said part towards the position of maximum interval setting, a member movable in the positional range of said interval determining part for limiting the movement of said part under the action of said biasing means, a photoelectric device for moving said member to a position corresponding to scene brightness, means movable into a position for holding said movable member stationary, a shutter release, and means movable through a fixed path for actuating in sequence said holding means, said shutter winding means and the shutter release.

4. A photographic camera including a shutter of the type in which, when the shutter is wound, a part which controls the exposure interval of the shutter in accordance with its position moves toward the position corresponding to the maximum exposure interval, a member movable in the positional range of said interval controlling part, a photoelectric device for moving said member to a position corresponding to scene brightness, means movable into a position to hold said movable member stationary, whereby when the shutter is wound said member limits the movement of the exposure controlling part, means movable for winding the shutter, a shutter release, and an operating member movable through a fixed path for actuating in sequence, said holding means, said shutter winding means and the shutter release.

ÖDÖN RISZDORFER.